No. 634,996. Patented Oct. 17, 1899.
A. L. PLATT.
AERIAL TOP.
(Application filed Sept. 6, 1898.)
(No Model.)
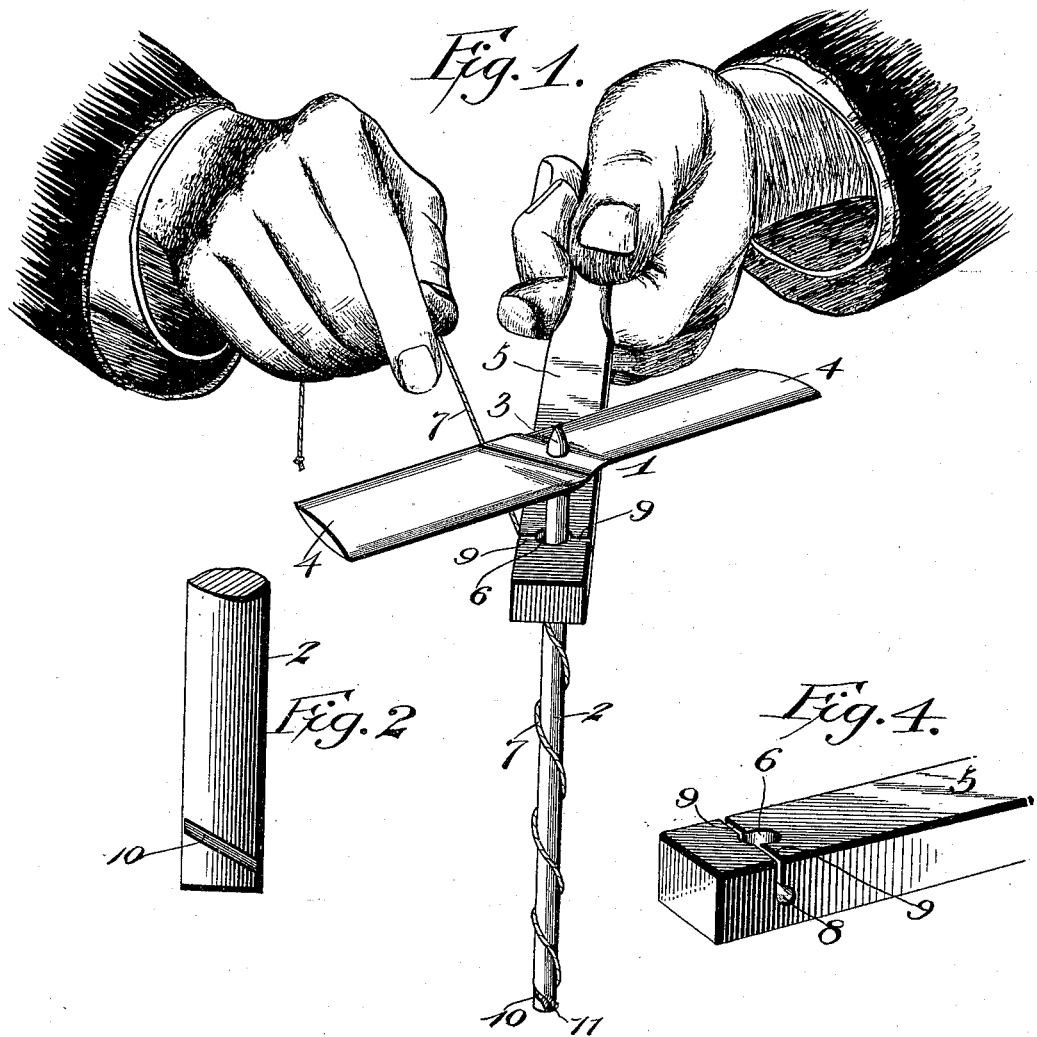
Witnesses
A. Roy Appleman
Albert L. Platt, Inventor.
By his Attorneys,
C. A. Snow & Co.

UNITED STATES PATENT OFFICE.

ALBERT L. PLATT, OF CLINTON, ILLINOIS, ASSIGNOR TO CLEMENT H. VAN LUE, OF SAME PLACE.

AERIAL TOP.

SPECIFICATION forming part of Letters Patent No. 634,996, dated October 17, 1899.

Application filed September 6, 1898. Serial No. 690,304. (No model.)

*To all whom it may concern:*

Be it known that I, ALBERT L. PLATT, a citizen of the United States, residing at Clinton, in the county of De Witt and State of Illinois, have invented a new and useful Aerial Top, of which the following is a specification.

My invention relates to aerial tops, and has for its object to provide a device of this class of such a construction as to cause it to gyrate while flying, and, furthermore, to provide a simple and efficient construction of means for propelling the same.

Further objects and advantages of this invention will appear in the following description and the novel features thereof will be particularly pointed out in the appended claims.

In the drawings, Figure 1 is a perspective view of a top constructed in accordance with my invention as seen preparatory to propulsion from the holder. Fig. 2 is a detail view of one end of the shank or stem of the top. Fig. 3 is a view of the blade, showing one of the wings in edge view. Fig. 4 is a detail view of a portion of the holder.

Similar numerals of reference indicate corresponding parts in all the figures of the drawings.

The top embodying my invention consists of a blade 1, to the center of which is attached a round stem or shank 2, projecting through a central enlarged or thickened portion of the blade and preferably projecting beyond the same to form a tapered knob 3. The blade at opposite sides of the transverse plane of the stem or shank is reduced and inclined transversely in opposite directions to form wings 4. These wings are preferably thin throughout, but their thinnest portions are contiguous to said enlargement or hub at the center of the blade. In other words, the wings are slightly thickened toward their outer extremities and are tapered inwardly in thickness, whereby the momentum of the blade in rotation is increased without materially adding to the weight of the top. Furthermore, the surfaces of the wings merge into those of the hub, whereby each side edge of the blade presents a continuous knife-edge to afford the minimum opposition to the rotary movement of the top.

In connection with the top I employ a holder 5, provided with a stem or shank socket 6, of sufficiently-larger diameter than the stem or shank to allow the same to pass freely therethrough when an operating-cord 7 is wrapped thereon. Also formed in the holder are right and left hand cord-guides 8, communicating with the stem or shank socket and having entrance-kerfs 9. At the lower end of the stem or shank, or at the end remote from the blade, is formed an obliquely-disposed cord-seat, kerf, or cut 10. This may consist of a saw-cut or the equivalent thereof, but it must be disposed obliquely in one side of the stem or shank and in the direction in which the operating-cord is wound upon the stem or shank. Obviously the direction of winding of the cord upon the stem or shank is controlled by the direction of inclination of the blade-wings, and when in order to cause the top to ascend it is necessary to wind the cord upon the stem in the direction of a left-hand screw, as illustrated, this cord-seat must incline downwardly from left to right upon the stem or shank.

To operate the toy, the cord must be provided at one end with a knot or enlargement 11 for engagement with one end of the cord-seat, said cord passing through the kerf and thence being wound continuously around the stem or shank and must be extended through the stem-socket and into the guide. Obviously this winding of the cord upon the stem may be accomplished before inserting the latter into the socket, and after inserting the stem the cord may be dropped through the entrance-kerf into the guide upon either side of the socket, according to whether the operator is right or left handed. Upon drawing firmly and steadily upon the free end of the cord, as indicated in Fig. 1, a double impulse will be imparted to the top—namely, an axial impulse, tending to throw the stem upwardly or forwardly out of the socket, and a rotary impulse, tending to spin the top in a direction to cause the inclined wings to throw the stem out of the socket. As the stem advances through the socket the operating-cord is unreeled therefrom, and the direction of inclination of the cord-seat at the rear end of the stem is such as to allow the release of the cord without causing any opposition to the forward movement of the top. I have found in practice that this disposition of the cord-seat at the rear end of the stem or shank is efficient in allowing this prompt disengagement of the cord from the stem or shank when the top reaches the proper point in its advance movement.

Aside from the advantages in manipulation, as above set forth, the top embodying my invention, by reason of the peculiar construction of its wings, is susceptible of numerous variations in operation, such as in the direction of movement and other gyrations, depending upon the efficiency of the operator. For instance, when the top is projected in a truly vertical direction it will rise to a height proportionate to the impulse imparted thereto, but will not vary materially in direction from a straight line, whereas if the top is projected in a truly horizontal direction it will fly in an approximately straight line until the initial momentum has to a certain extent become exhausted, whereupon the stem or shank will depress in advance of the blade, thus inclining said stem or shank forwardly and upwardly and causing the top to move in a gradually-ascending direction In other words, after traveling horizontally for a considerable distance a top constructed as described will begin to ascend and may toward the end of its movement travel in a vertical direction. This is due to the weight of the stem or shank, which has a tendency to drop, irrespective of the blade, soon after the top has been projected from the holder. By projecting the top obliquely or at an upward inclination it may be caused to travel in a curved path, gradually approaching the point from which it was propelled, or, in other words, acting somewhat after the fashion of a boomerang and at the same time a vibratory gyration may be produced.

The gyrations of the top embodying my invention depend also to a certain extent upon the relative weights of the blade and the stem. Thus in manipulating the top a wide range of possibility in the matter of operation, such as in the position in which the holder is maintained during the propulsion of the device, is open to the operator, and after practice the operator becomes skilled in controlling the direction of movement and the gyrations of the device.

Various changes in the form, proportion, and the minor details of construction may be resorted to without departing from the spirit or sacrificing any of the advantages of this invention.

Having described my invention, what I claim is—

1. An aerial top having a stem or shank, and a blade extending in opposite directions from the stem or shank and provided with upper and lower transversely-convexed surfaces and opposite continuous knife-edges, said blade forming wings which are inclined transversely in opposite directions, substantially as specified.

2. An aerial top having a stem or shank, and a blade extending in opposite directions from the stem or shank, and provided with a central thickened portion or hub and alined radial wings inclined transversely in opposite directions and having upper and lower convexed surfaces merged into those of said central enlargement or hub to form continuous opposite lateral knife-edges, substantially as specified.

3. An aerial top having a stem, and a blade extending in opposite directions from the stem to form oppositely-inclined wings, in combination with a holder 5, elongated laterally with relation to said stem, and having a transverse stem-socket, and an operating-cord adapted to be reeled upon the stem, said stem being provided near its rear end with an obliquely-disposed cord-seat 10, substantially as specified.

4. An aerial top having a stem, and a blade extending in opposite directions from the stem to form oppositely-inclined wings, in combination with a holder extended laterally with relation to the stem, and having a transverse stem-socket and a communicating lateral cord-guide, and an operating-cord adapted to be reeled upon the stem and extended through said guide and provided with a terminal knot or enlargement, said stem being provided near its rear end with an obliquely-disposed kerf forming a cord-seat, with one end of which is engaged the terminal knot of the cord, substantially as specified.

5. An aerial top having a stem or shank provided at its front end with a blade forming oppositely-extending wings 4, and at its rear end with an obliquely-disposed cord-seat 10, in combination with a holder 5 having a seat or shank socket 6, right and left hand cord-guides 8 communicating with said socket, and entrance-kerfs 9 extending inwardly from one surface of the holder and communicating with said cord-guides, substantially as specified.

6. The herein-described aerial top having a stem or shank terminating at one end in a blade forming oppositely-inclined wings, and provided at the other end with an obliquely-disposed open-sided kerf forming a cord-seat, substantially as specified.

In testimony that I claim the foregoing as my own I have hereto affixed my signature in the presence of two witnesses.

ALBERT L. PLATT.

Witnesses:
WILBER M. CARTER,
WILLIAM J. CARTER.